Feb. 1, 1944.  C. F. WALLACE  2,340,718
BAROMETRIC TELEMETERING TRANSMITTER
Original Filed Dec. 31, 1941  2 Sheets-Sheet 1

INVENTOR.
Charles F. Wallace
BY
his ATTORNEY

Feb. 1, 1944.　　C. F. WALLACE　　2,340,718
BAROMETRIC TELEMETERING TRANSMITTER
Original Filed Dec. 31, 1941　　2 Sheets-Sheet 2

INVENTOR.
Charles F. Wallace
BY Arthur A. Kent
his ATTORNEY

Patented Feb. 1, 1944

2,340,718

UNITED STATES PATENT OFFICE 2,340,718

BAROMETRIC TELEMETERING TRANSMITTER

Charles F. Wallace, Westfield, N. J., assignor to Wallace & Tiernan Products, Inc., Belleville, N. J., a corporation of New Jersey Original application December 31, 1941, Serial No. 425,026. Divided and this application October 8, 1942, Serial No. 461,326

6 Claims. (Cl. 200—83)

This invention relates to pressure-responsive telemetering transmitters for radiometeorograph transmitting apparatus, or radiosondes, that is, apparatus for the measurement of meteorological conditions through various levels of the atmosphere and radio transmission of the measurements to a receiver and recorder at a receiving station; and especially to pressure-responsive telemetering transmitters intended for radio-meteorograph transmitters of comparatively light weight suitable to be carried by small "sounding" balloons either free or captive.

The object of the invention is to provide an improved pressure-responsive telemetering instrument or device characterized by light weight together with great accuracy and reliability and ease of adjustment.

This application is a division of my application Serial No. 425,026, filed December 31, 1941.

In the accompanying drawings which show an embodiment of the invention in the form now considered best—

Figure 1:
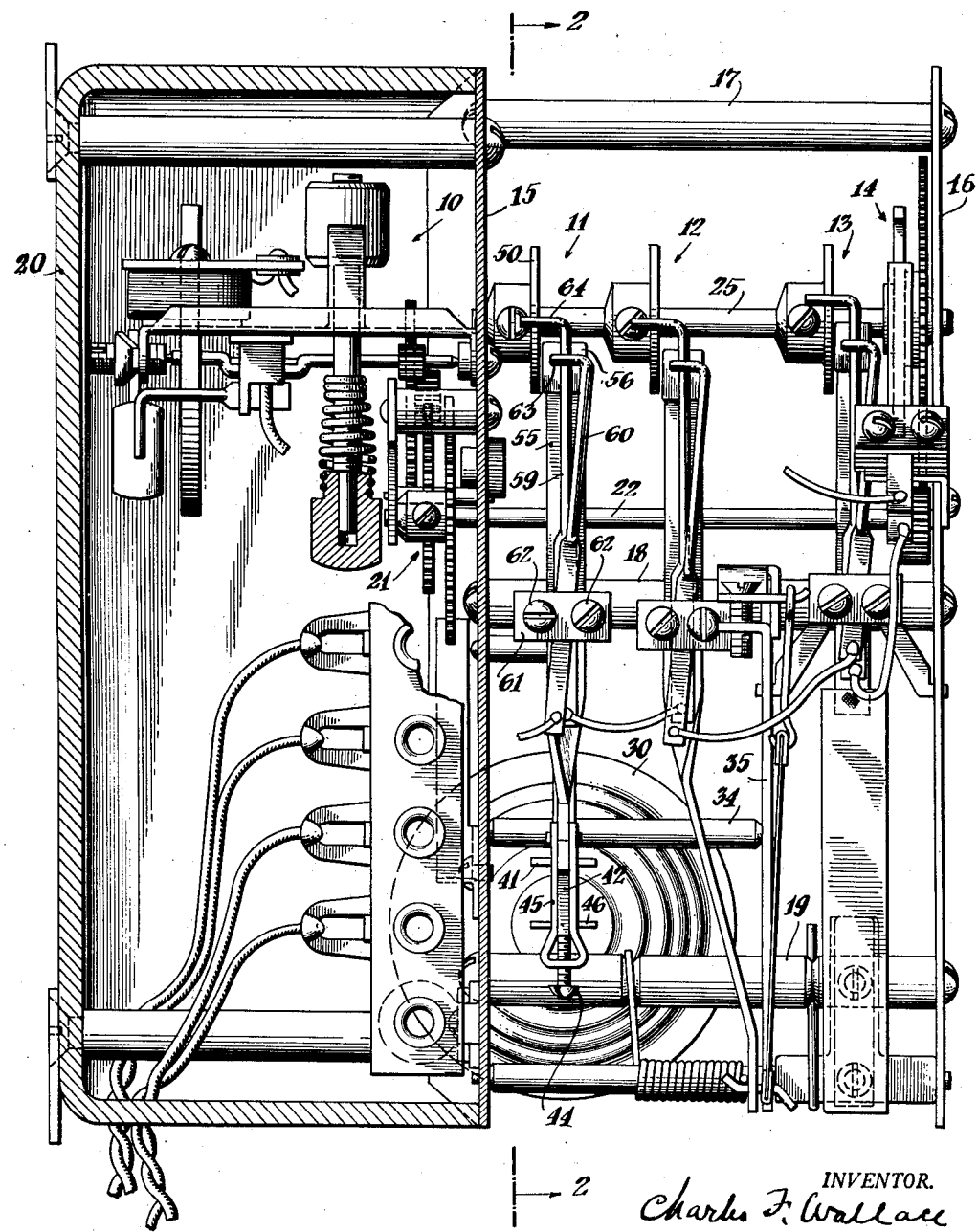
Fig. 1 is a side view of the apparatus parts and their mountings of a meteorological transmitter which includes a pressure-responsive circuit-controlling device, or telemetering transmitter, according to the invention of this application.

Fig. 1 shows the meteorological transmitter of my said original application Serial No. 425,026. Said transmitter comprises a driving motor 10; and three meterorological circuit-controlling instruments, or telemetering transmitters, that is, a pressure-responsive instrument 11, a humidity-responsive instrument 12, and a temperature-responsive instrument 13; and an indexing circuit-controlling device 14. The mounting structure for these apparatus parts comprises a support plate 15 on one side of which the driving motor 10 is mounted, and a plate 16 spaced off from the other side of the plate 15 by means of spacing posts 17, 18 and 19 extending between the plates, the circuit-controlling instruments and the indexing circuit-controlling device being mounted side by side between these two plates, and the motor being enclosed by a light-weight casing 20 secured to the plate 15. The motor drives, through a train of reduction gearing 21, a shaft 22 from which a shaft 25 which carries the cams of the circuit-controlling instruments and of the indexing device is driven. This complete unitary structure is adapted to be housed in a suitable casing to form part of a complete radio-meteorograph transmitter.

Figure 2:
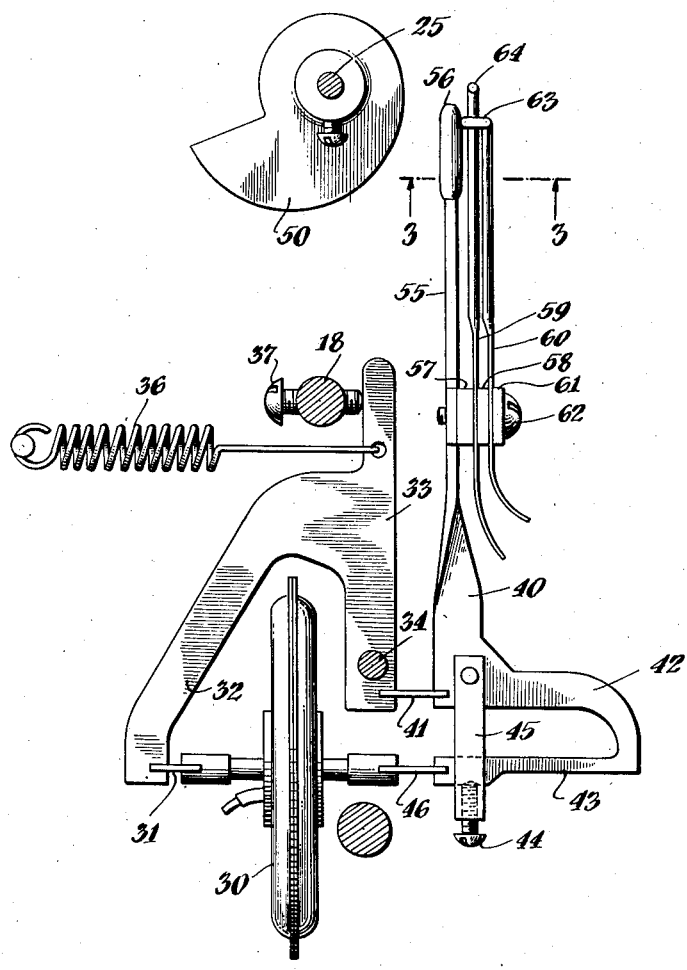
Fig. 2 is a view of the pressure-responsive circuit-controlling instrument taken on line 2—2 of Fig. 1.

The only part of this meteorological transmitter with which the invention of this application is concerned is the pressure-responsive circuit-controlling instrument 11. Therefore, no further description need be given of the other parts shown in Fig. 1, all of which are fully described in my said original application Serial No. 425,026 and features of which are claimed in said application and in other divisions of said application. The pressure-responsive device which forms the subject matter of the present application, which appears in Fig. 1 and is further illustrated by Figs. 2 and 3, will now be described.

This pressure-responsive instrument or device as shown comprises a pressure element, or barometric capsule, 30 of more or less conventional construction, consisting of two somewhat dished corrugated diaphragms of metal of high elastic limit joined together at their peripheries to form a chamber from which air is evacuated. A stud extending from one side of the capsule is pivotally connected by a transversely extending thin pivot plate or leaf of spring metal 31 to an arm 32 of a support member 33 which is mounted fast on a pintle 34 pivoted at one end in the plate 15 and at the other end in a plate 35 mounted on the posts 18 and 19, opposite edges of the pivot plate 31 being set in transverse slots in said stud and in the end of the arm 32 and being secured therein by solder. The support member 33 is held by a spring 36 against an adjustable stop formed by a screw 37 carried by the post 18. A transmitter arm 40 which carries at its outer end the circuit-controlling contact assembly is pivotally connected at its inner or fulcrum end to the support member 33 at a point adjacent the pintle 34 by a thin pivot plate or leaf of spring metal 41 extending into and soldered in transverse slots in the support member and in the transmitter arm.

The transmitter arm has at its inner end a lateral extension 42 from which extends a spring finger 43 which is pressed toward the end of the transmitter arm by an adjusting screw 44 threaded into the bight of a double bent strap 45, the ends of which extend on either side of and are secured to the end of the transmitter arm. The end of this finger 43 is pivotally connected to a stud extending from the opposite side of the capsule 30 from that from which the stud to which arm 32 is connected, this connection also being by a thin pivot plate or leaf of spring metal 46 extending into and soldered in transverse slots in the end of said stud and in the end of the finger 43.

A rotary cam 50 of Bakelite or other non-conducting wear-resisting material, shown as mounted fast on shaft 25 of the meteorological transmitter of Fig. 1, operates the contact assembly carried by the transmitter arm 41 to open momentarily a closed circuit to a radio transmitter at a time during each revolution of shaft 25 depending on the position of the transmitter arm as determined by the condition of the pressure capsule 30 in response to atmospheric pressure.

Referring now to the circuit-controlling contact members constituting the contact assembly: The transmitter arm 40 carries or is extended to form a support bar or strip 55 having an insulating coating 56 on its outer end, and on this support bar at or near the inner end there is mounted a plate 57 of insulating material, and between this plate and a similar plate 58 is secured the flattened end of a spring contact rod or wire 59, preferably of silver or other rare metal. Another similar contact rod or wire 60 has its flattened end clamped between the insulating plate 58 and a third plate 61 of insulating material, the three plates being clamped together by means of screws 62, the contact rods thus being adjustable longitudinally on loosening the screws 62. The free end of rod 60 is bent transversely and then over to form a U, as indicated at 63, thus providing in effect two spaced contact terminals. The free end of rod 59 extends through the U-form end 63, and beyond 63 it is bent at right angles to form a cam-engaging end 64.

Figure 3:
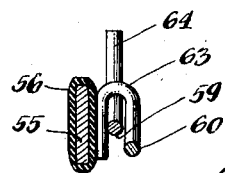
Fig. 3 is an enlarged detail sectional view taken on line 3—3 of Fig. 2.

The two contact rods 59 and 60 are tensioned so that when not engaged by the cam 50 the end of rod 60 rests on the insulated end of the support bar and the end of rod 59 rests on the lower arm of the U-form end of rod 60, as appears best in Fig. 3. When the cam 50 in its revolution makes contact with the cam-engaging end 64 of contact rod 59, the rod is raised out of engagement with the lower arm of the U end of rod 60, thus opening the circuit at this point, and then as the revolution of the cam continues, the rod 59 is quickly raised further into engagement with the upper arm of the U end of rod 60, thus reestablishing contact between the two contact rods, and thereafter contact rods 59 and 60 are moved together until the high point of the cam passes beyond the end 64 of rod 59, whereupon the rods return to their position of rest on the end of the support bar. Contact between the two rods 59 and 60 is thus interrupted for a very short period, say a second or less, during each revolution of the operating cam 50, while rod 59 is moved by the cam from the lower arm to the upper arm of the U-form end of rod 60. Therefore, the transmitter circuit is interrupted at some time during the rotation of the cam, and the time in each rotation of the cam, that is, the position in time in each successive cycle of the operation of the device at which the interruption occurs, depends on the angular motion imparted to the support bar 55 by the barometric capsule 30.

By turning the screw 44 to adjust the finger 43 toward or from the end of the transmission arm, thus varying the distance between the fulcrum plate 41 and the connecting plate 46 through which expanding and contracting movements of the capsule 30 are applied to the transmitter arm to swing it on its fulcrum 41, the magnitude of movement imparted to the transmitter arm and the contact assembly carried thereby by the barometric capsule for a given atmospheric pressure change may be adjustably varied, thereby adjustably varying the spread on the recorder chart of the data markings indicating such pressure change. By this range adjustment, therefore, variations in the expansion and contraction of the barometric capsule resulting from difference in the materials or construction of the capsule can be compensated for, and the movement of the transmitter arm can be maintained within any desired predetermined range. Angular adjustment of the transmitter arm by means of the adjusting screw 37 determines the point on the cam, and, therefore, the time in the cycle, at which the contact assembly carried by the transmitter arm is operated by the cam for any condition of the barometric capsule, that is, for any atmospheric pressure. This adjustment, therefore, determines the time in each cycle of operations at which the signals are transmitted, and, therefore, determines the position of the range of pressure markings on the chart of the recording instrument.

Therefore, by the range adjustment by means of screw 44 the horizontal spread of the data markings on the recorder chart may be adjusted to agree with the spacing of printed pressure lines of the chart, and by the angular, or positioning, adjustment of the transmitter arm by means of the screw 37 the exact location on the chart of the data markings may be adjusted to the printed chart markings. The instrument may thus be readily calibrated so that its transmission will result in a record which may be read directly without resort to any correction factors whatever. The range of the data markings on the chart will, of course, depend primarily on the effective peripheral length of the cam, and the location on the chart of the data markings will depend primarily on the angular position of the cam, fine adjustment for range and position of the data markings being by means of the screws 44 and 37.

If the movement imparted to the transmitter arm 40 and to the contact assembly carried thereby is non-linear, that is, not proportional to changes in the atmospheric pressure as measured by the barometric capsule 30, the contour of the cam 50 can be so shaped as to produce time interval increments that are linear or directly proportional to changes in atmospheric pressure. Also, the contour of the operating cam can be shaped to produce non-uniform time interval increments, thereby permitting certain portions of the pressure range to be spread out on the recorder chart in order to permit their more accurate study on the chart, in the same manner and as more fully explained in my copending patent application Serial No. 327,767, filed April 4, 1940. Barometric telemetering transmitters according to the present invention embody features of invention claimed in said application.

What is claimed is:

1. A barometric telemetering transmitter, comprising a pressure capsule which is expansible and contractable in response to changes in atmospheric pressure, a rotary cam, a U-shaped support member to one arm of which one side of the capsule is pivotally connected, a transmitter arm pivotally connected with the other arm of the U-shaped member and pivotally connected to the other side of the capsule, a contact assembly comprising two relatively movable contact members for coacting with the cam carried by said transmitter arm, and means for variably adjusting the distance between the pivotal connection of the transmitter arm to the U-shaped member and the pivotal connection of the transmitter arm to the capsule for varying the magnitude of movement imparted to the contact assembly for a given change in atmospheric pressure.

2. A barometric telemetering transmitter as claimed in claim 1, in which the pivotal connection of the capsule to the transmitter arm is to a spring finger extending from a lateral extension of the transmitter arm, the end of said spring finger to which the pivotal connection is made being spaced from the pivotal connection of the transmitter arm to the support member and tensioned to move away therefrom, and being adjustably held against its spring tension by means adjustable for varying the distance between the pivotal connection of the spring finger to the capsule and the pivotal connection of the transmitter arm to the support member.

3. A barometric telemetering transmitter, comprising a pressure capsule which is expansible and contractable in response to changes in atmospheric pressure, a rotary cam, a U-shaped support member to one arm of which one side of the capsule is pivotally connected, a transmitter arm pivotally connected with the other arm of the U-shaped member and pivotally connected to the other side of the capsule, a contact assembly comprising two relatively movable contact members for coacting with the cam carried by said transmitter arm, means for variably adjusting the distance between the pivotal connection of the transmitter arm to the U-shaped member and the pivotal connection of the transmitter arm to the capsule for varying the magnitude of movement imparted to the contact assembly for a given change in atmospheric pressure, and means for adjusting said U-shaped member angularly for adjusting the contact assembly with relation to the cam to vary the time of operation of the contact assembly.

4. A barometric telemetering transmitter, comprising a pressure capsule which is expansible and contractable in response to changes in atmospheric pressure, a rotary cam, a U-shaped support member to one arm of which one side of the capsule is pivotally connected, a transmitter arm pivotally connected with the other arm of the U-shaped member and pivotally connected to the other side of the capsule, a contact assembly comprising two relatively movable contact members for coacting with the cam carried by said transmitter arm, means for variably adjusting the distance between the pivotal connection of the transmitter arm to the U-shaped member and the pivotal connection of the transmitter arm to the capsule for varying the magnitude of movement imparted to the contact assembly for a given change in atmospheric pressure, the support member being pivotally mounted for angular adjustment about a pivotal axis adjacent the pivotal connection of the U-shaped member to the transmitter arm, a spring tending to turn the support member in one direction, and an adjustable abutment for holding said member against the spring and by adjustment of which abutment the support member is adjustable angularly for adjusting the contact assembly with relation to the cam to vary the time of operation of the contact assembly.

5. A barometric telemetering transmitter, comprising a pressure capsule which is expansible and contractable in response to changes in atmospheric pressure, a rotary cam, a U-shaped support member to one arm of which one side of the capsule is pivotally connected, a transmitter arm pivotally connected with the other arm of the U-shaped member and pivotally connected to the other side of the capsule, a contact assembly comprising two relatively movable contact members for coacting with the cam carried by said transmitter arm, the support member being pivotally mounted for angular adjustment about a pivotal axis adjacent the pivotal connection of the U-shaped member to the transmitter arm, a spring tending to turn the support member in one direction, and an adjustable abutment for holding said member against the spring and by adjustment of which abutment the support member is adjustable angularly for adjusting the contact assembly with relation to the cam to vary the time of operation of the contact assembly.

6. A barometric telemetering transmitter, comprising a pressure capsule which is expansible and contractable in response to changes in atmospheric pressure, a rotary cam, a U-shaped support member to one arm of which one side of the capsule is pivotally connected, a transmitter arm pivotally connected with the other arm of the U-shaped member and pivotally connected to the other side of the capsule, a contact assembly comprising two relatively movable contact members for coacting with the cam carried by said transmitter arm, and means for adjusting said U-shaped member angularly for adjusting the contact assembly with relation to the cam to vary the time of operation of the contact assembly.

CHARLES F. WALLACE.